(12) United States Patent
Akiba et al.

(10) Patent No.: US 6,442,454 B1
(45) Date of Patent: Aug. 27, 2002

(54) FRONT WHEEL-AND REAR-WHEEL DRIVE VEHICLE

(75) Inventors: Toru Akiba, Yokohama; Takashi Hashimoto, Kanagawa, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 101 days.

(21) Appl. No.: 09/708,002

(22) Filed: Nov. 8, 2000

(30) Foreign Application Priority Data

Nov. 11, 1999 (JP) ............................................. 11-321037

(51) Int. Cl.$^7$ ............................................. B60K 17/356
(52) U.S. Cl. ....................... 701/22; 180/65.2; 180/65.3; 701/89
(58) Field of Search ............................. 701/22, 89, 69; 180/65.1, 65.2, 65.6, 247, 65.3, 248; 318/3

(56) References Cited

U.S. PATENT DOCUMENTS

| | | | |
|---|---|---|---|
| 5,164,903 A | * 11/1992 | Lin et al. | 180/248 |
| 5,453,930 A | * 9/1995 | Imaseki et al. | 180/65.3 |
| 5,492,192 A | * 2/1996 | Brooks et al. | 180/65.3 |
| 5,788,005 A | 8/1998 | Arai | 180/65.2 |
| 6,041,877 A | * 3/2000 | Yamada et al. | 180/65.2 |
| 6,205,379 B1 | * 3/2001 | Morisawa et al. | 701/22 |
| 2002/0041167 A1 | * 4/2002 | Kitano et al. | 318/3 |

FOREIGN PATENT DOCUMENTS

JP      8-300965    11/1996

* cited by examiner

Primary Examiner—Gary Chin
(74) Attorney, Agent, or Firm—McDermott, Will & Emery

(57) ABSTRACT

In a front wheel-and rear-wheel drive vehicle having a motor such as an engine to develop a mechanical energy and to drive either one of front road wheels or rear road wheels of the vehicle and another motor such as an electric motor to develop the mechanical energy and to drive the other of the front road wheels or the rear road wheels, a drive controller is provided to control a driving force of the other motor, a front-and-rear road wheel velocity difference detector is provided to detect a front-and-rear road wheel velocity difference ($\Delta N$) between the front and rear road wheels, a driver's vehicular acceleration intention detector such as an accelerator pedal depression sensor is provided to detect a manipulated variable (PS) representing a driver's vehicular acceleration intention, a target torque calculating section calculates a target torque outputted from the other motor in accordance with the detected front-and-rear road wheel velocity difference and the manipulated variable, another motor driven road wheel acceleration detector is provided to detect an acceleration ($dN_R$) of another motor driven road wheel by means of the other motor, and a corrector corrects the target torque on the basis of the acceleration of the other motor driven road wheel and the manipulated variable representing the driver's vehicular acceleration intention. The drive controller provides a motor drive torque (T*) for the other motor on the basis of the target torque which is corrected by the target torque corrector.

10 Claims, 5 Drawing Sheets

ΔN
(FRONT ROAD WHEEL VELOCITY
- REAR ROAD WHEEL VELOCITY)

ACCELERATOR PEDAL
DEPRESSION DEPTH PS

FRONT WHEEL-AND REAR-WHEEL DRIVE VEHICLE

BACKGROUND OF THE INVENTION

1. Field of the invention

The present invention relates to a front wheel-and rear-wheel drive vehicle in which one of either front road wheels or rear road wheels is driven by means of a motor such as an engine and the other is driven by means of another motor such as an electric motor.

2. Description of the Related Art

A Japanese Patent Application First Publication No. Heisei 8-300965 published on Nov. 19, 1996 (which corresponds to a U.S. Pat. No. 5,788,005 issued on Aug. 4, 1998) exemplifies a previously proposed front wheel-and rear-wheel drive vehicle in which the vehicle can run utilizing both of a mechanical energy caused by an internal combustion engine and an electrical energy caused by an electric motor.

In the front wheel-and rear-wheel drive vehicle disclosed in the above-described United States Patent, when front left and right road wheels are driven by means of the engine and rear left and right road wheels are driven by means of the electric motor, a driving force applied to the front road wheels and a slip rate of the front road wheels are detected. On the basis of a correlation between these detected values, a frictional coefficient $\mu$ on a road surface is detected.

When the previously proposed front wheel-and rear-wheel drive vehicle is started, the motor is operated. at an initial stage of the vehicle start if the frictional coefficient $\mu$ detected before the vehicle has stopped is equal to or below a predetermined value $\mu s$. Hence, the rear road wheels are driven by means of the motor when the vehicle is started on the road surface having the low frictional coefficient to perform a start assistance through the rear road wheels.

SUMMARY OF THE INVENTION

However, the frictional coefficient $\mu$ of the road surface is detected through the correlation between the driving force exerted on the front road wheels and the slip rate of the same road wheels and the drive of the motor to drive the rear road wheels is controlled on the basis of the road frictional coefficient $\mu$ on the front road wheels. Hence, for example, if the frictional coefficient $\mu$ is different between positions at the front and rear road wheels, the rear road wheels are controlled on the basis of the frictional coefficient of the road surface which is different from an actual frictional coefficient on the motor driven rear road wheels.

Consequently, an appropriate drive control of the rear road wheels cannot be achieved such as due to an occurrence of the slip.

It is therefore an object of the present invention to provide a front wheel-and rear-wheel drive vehicle which can appropriately control the drive of the motor in accordance with a road surface situation on which the vehicle is running.

The above-described object can be achieved by providing a front wheel-and rear-wheel drive vehicle comprising: a motor to develop a mechanical energy and to drive either one of front road wheels or rear road wheels of the vehicle; another motor to develop the mechanical energy and to drive the other of the front road wheels or the rear road wheels; a drive controller to control a driving force of the other motor; a front-and-rear road wheel velocity difference detector to detect a front-and-rear road wheel velocity difference between the front and rear road wheels; a driver's vehicular acceleration intention detector to detect a manipulated variable representing a driver's acceleration intention; a target torque calculating section that calculates a target torque outputted from the other motor in accordance with the detected front-and-rear road wheel velocity difference and manipulated variable representing the driver's acceleration intention; another motor driven wheel acceleration detector to detect an acceleration of another motor driven road wheel driven by means of the other motor; and a target torque corrector to correct the target torque on the basis of the acceleration of the other motor driven road wheel detected by the other motor driven wheel acceleration detector and the manipulated variable representing the driver's vehicular acceleration intention detected by the driver's vehicular acceleration intention detector.

DETAILED DESCRIPTION OF THE PREFERRED EMBODIMENT

Reference will hereinafter be made to the drawings in order to facilitate a better understanding of the present invention.

Figure 1A:
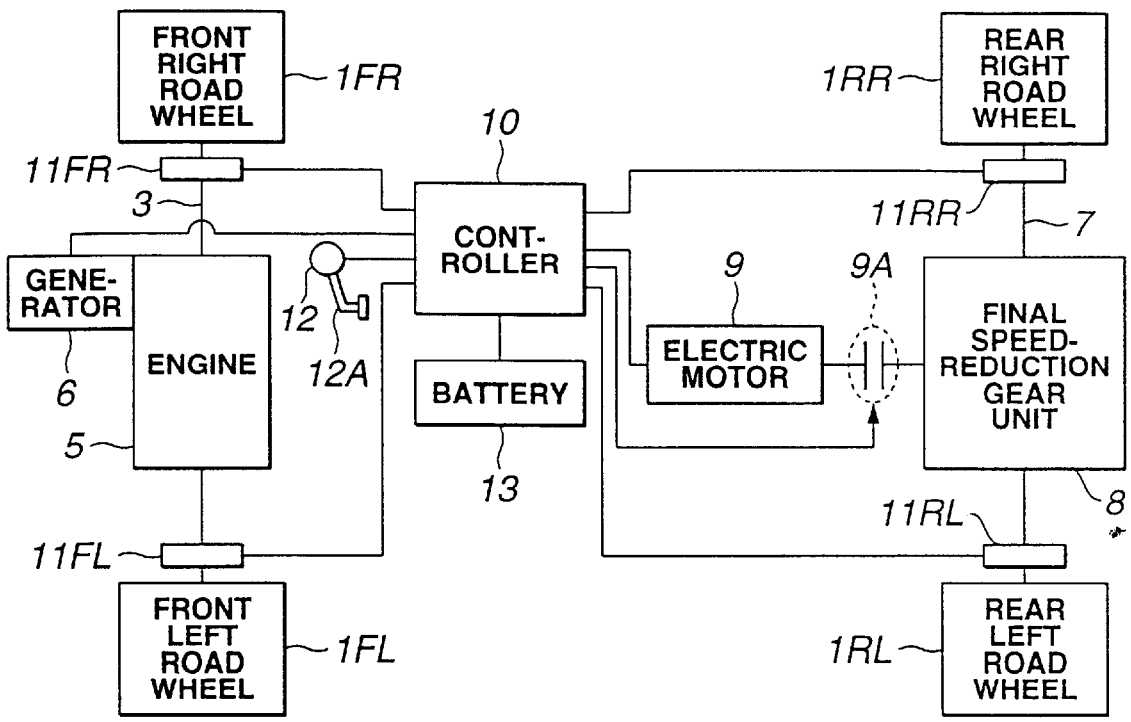
FIG. 1A shows a schematic circuit block diagram of a front wheel-and rear-wheel drive vehicle in a preferred embodiment according to the present invention.

FIG. 1A shows a rough configuration view of a preferred embodiment of a front wheel-and rear-wheel drive vehicle according to the present invention.

In FIG. 1A, 1FL and 1FR denote front left and right road wheels and 1RL and 1RR denote rear left and right road wheels.

In FIG. 1A, an engine 5 provides a drive source for developing a mechanical energy to rotate the front left and right road wheels 1FL and 1FR. A driving force developed by the engine 5 is transmitted to the front left and right road wheels 1FL and 1FR via a wheel drive axle 3. Thus, the front left and right wheels 1FL and 1FR are driven by the engine 5.

A generator 6 to be driven by the engine 5 and to generate an electric power is installed on the engine 5. An electrical energy obtained from the generator 6 is stored into a battery 13 via a controller as will be described later.

On the other hand, rear left and right road wheels 1RL and 1RR are linked to an electric motor 9 via a rear side wheel drive axle 7 and a final reduction gear unit 8.

A controller 10 controls a driving force exerted by electric motor 9. A power (drive torque) from motor 9 is transmitted to rear left and right road wheels 1RL and 1RR via final reduction gear unit 8 and rear-side wheel drive axle 7. Thus, the rear left and right road wheels 1RL and 1RR are driven.

In addition, road wheel velocity sensors 11FL, 11FR, 11RL, and 11RR are disposed on respective appropriate positions of the vehicle to detect revolution speeds of the respective road wheels 1FL, 1FR, 1RL, and 1RR. An accelerator pedal depression sensor 12 detects a depression depth PS of an accelerator pedal 12A. In addition, a detection signal from each sensor is outputted to controller 10.

Figure 1B:
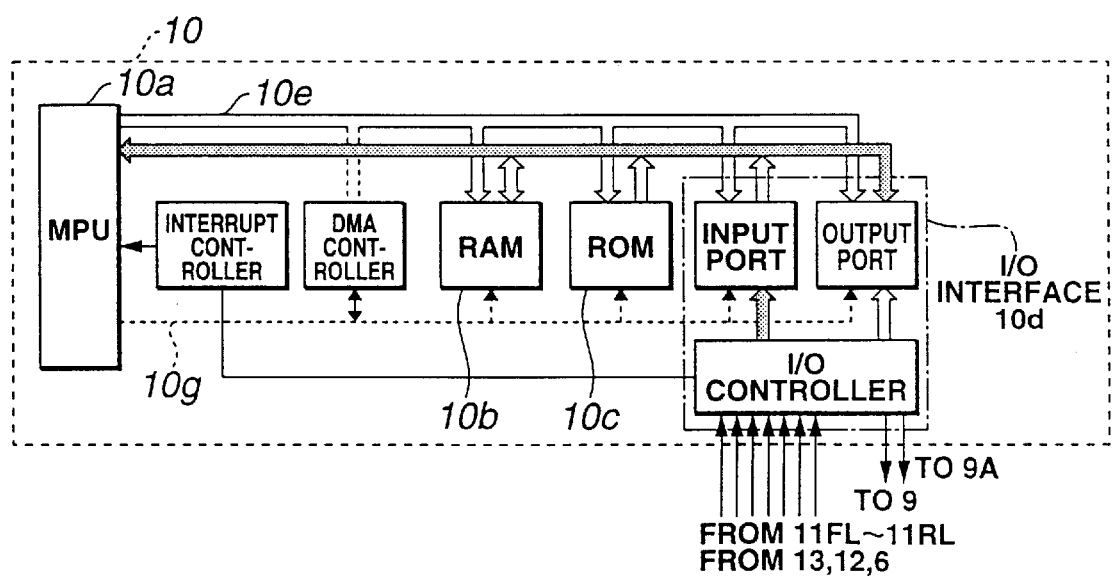
FIG. 1B shows a schematic internal circuit block diagram of a controller shown in FIG. 1A.

FIG. 1B shows an internal circuit of a microcomputer constituting controller 10 shown in FIG. 1A.

As shown in FIG. 1B, the microcomputer includes: an MPU 10a (Microprocessor Unit); a RAM 10b (Random Access Memory); a ROM 10c (Read Only Memory); an I/O interface 10d having an Input Port, an Output Port, and an I/O controller; an Interrupt Controller; a DMA controller; a control bus 10g; and an address bus 10e.

On the basis of detection signals of road wheel velocity sensors 11FL, 11FR, 11RL, and 11RR, controller 10 calculates a wheel revolution velocity difference ΔN (a front-and-rear road wheel velocity difference) between the front and rear road wheels, calculates a control torque T that the motor 9 outputs on the basis of a detected value of an accelerator pedal depression depth PS(also called, a pedal stroke) from the accelerator pedal depression sensor 12 and the calculated wheel revolution velocity difference ΔN.

Furthermore, a controller 10 calculates a rear road wheel acceleration $dN_R$ on the basis of the detection signals of road wheel velocity sensors 11RL and 11RR at rear left and right road wheels 1RL and 1RL.

A correction coefficient r is calculated on the basis of rear road wheel acceleration $dN_R$ and the accelerator pedal depression depth PS. Then, controller 10 calculates a motor drive torque T* on the basis of correction coefficient r and control torque T. Accordingly, a driving force of motor 9 is controlled by means of controller 10.

It is noted that an electromagnetic clutch 9A is interposed between electric motor 9 and final speed-reduction gear unit 8. Hence, motor 9 is connected by means of controller 10 to final speed-reduction gear unit 8 when the vehicle is started and is accelerated.

Figure 2:
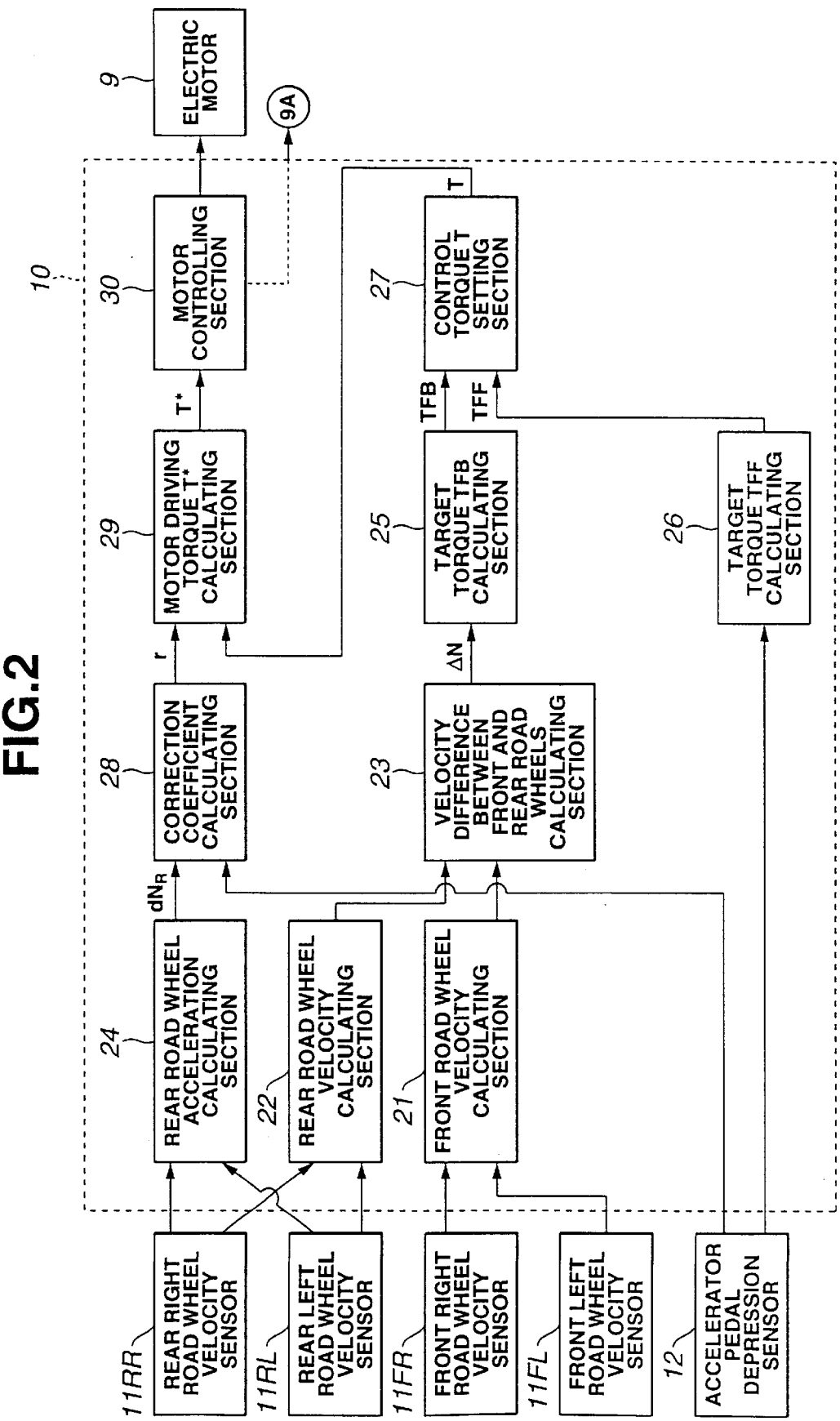
FIG. 2 is a functional block diagram of a rough configuration of the controller shown in FIGS. 1A and 1B.

FIG. 2 shows a functional block diagram representing a rough configuration of controller 10.

The detection signals of road wheel velocity sensors 11FL and 11FR at front left and right road wheels 1FL and 1FR are inputted to a front road wheel velocity calculating section 21. Front road wheel velocity calculating section 21 calculates the road wheel velocity of front road wheel on the basis of these detection signals. Similarly, the detection signals of the road wheel velocity sensors 11RL and 11RR are inputted to a rear road wheel velocity calculating section 22. The rear road wheel velocity calculating section 22 calculates the wheel velocity of rear road wheel on the basis of these detection signals.

A wheel velocity difference calculating section 23 calculates front-and-rear road wheel velocity difference ΔN between front and rear road wheels on the basis of the calculated front and rear road wheel velocities from front and rear road wheel velocity calculating sections 21 and 22.

The detection signals of road wheel velocity sensors 11RL and 11RR are inputted to a rear road wheel acceleration section 24.

Detection signals of road wheel velocity sensors 11RL and 11RR are inputted to a rear road wheel acceleration calculating section 24. A rear road wheel acceleration $dN_R$ is calculated on the basis of these detection signals. A velocity difference ΔN between the front and rear road wheels calculated (or detected) by the front and rear road wheel velocity difference calculating section 23 is outputted to a target torque TFB calculating section 25. Target torque TFB calculating section 25 calculates a target torque TFB in accordance with a control map, for example, shown in FIG. 3, on the basis of front-and-rear road wheel velocity difference ΔN between the front and rear road wheels.

On the other hand, depression depth PS of the accelerator pedal from accelerator pedal depression depth sensor 12 is inputted to a target torque TFF calculating section 26.

Figure 4:
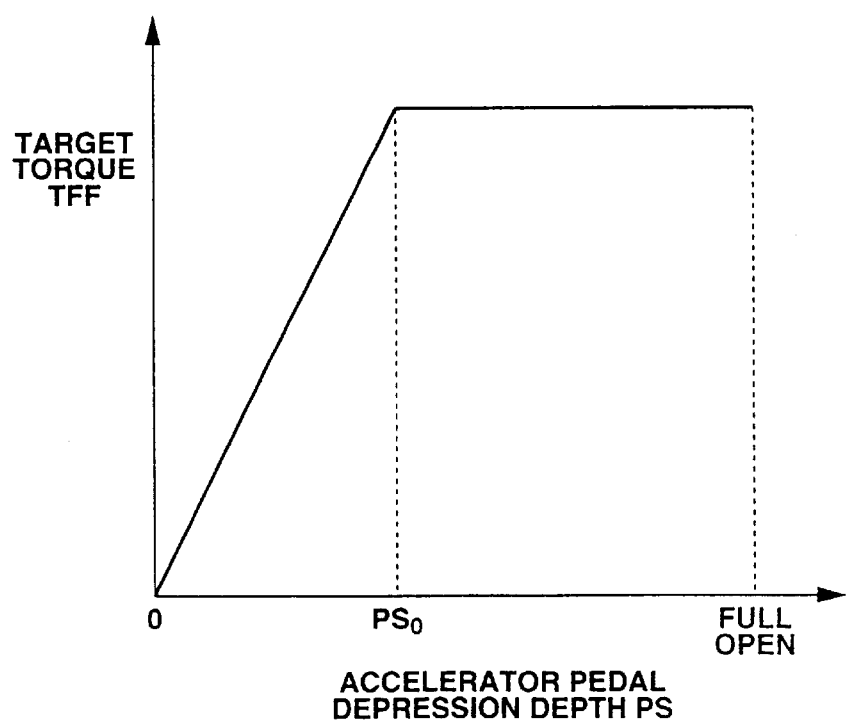
FIG. 4 is a control map to derive a target torque TFF from a depression depth PS of an accelerator pedal in the controller shown in FIGS. 1A and 1B.

Target torque TFF calculating section 26 calculates a target torque TFF by a table search from a control map, for example, shown in FIG. 4.

Then, a control torque setting section 27 sets one of target torque values TFB and TFF calculated at respective target torque calculating sections 25 and 26 which is larger than the other (select high or max(TFB, TFF)) as a control torque T.

Figure 3:
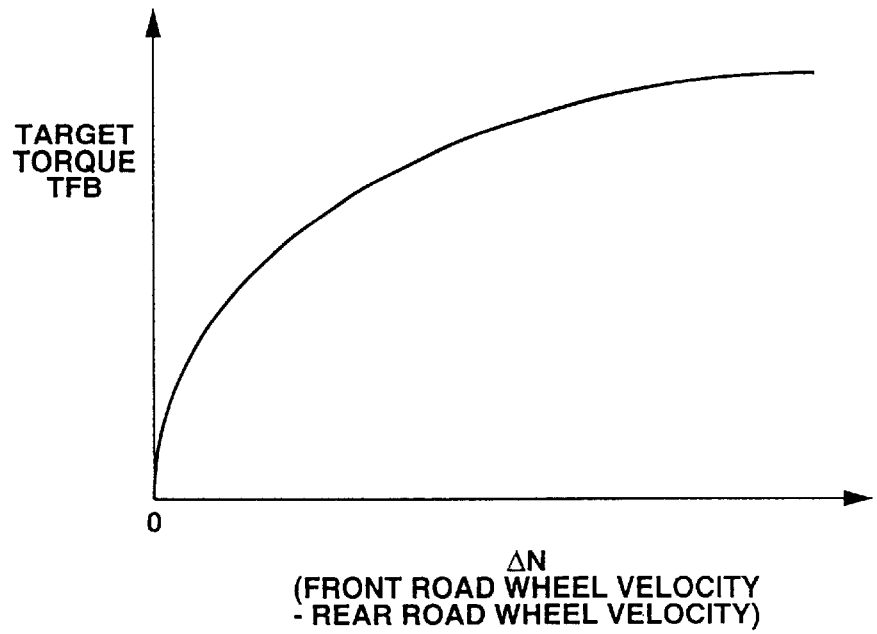
FIG. 3 is a control map to calculate a target torque TFB from a front-and-rear road wheel velocity difference $\Delta N$.

The control map shown in FIG. 3 is stored into a predetermined memory area in a two-dimensional array form. For example, as front-and-rear road wheel velocity difference ΔN is increased, target torque TFB is increased. As front-and-rear road wheel velocity difference ΔN between the front and rear road wheels is reduced, a rate of increase in target torque TFB is reduced.

A control map shown in FIG. 4 is previously stored in another predetermined memory area in the two-dimensional array form.

For example, while accelerator pedal depression depth PS indicates a value from zero to a threshold value $PS_0$, target torque TFF is increased in proportion to an increase in accelerator pedal depression depth PS.

While accelerator pedal depression depth PS is in excess of threshold value $PS_0$, target torque TFF is fixedly set to a predetermined value.

Figure 5:
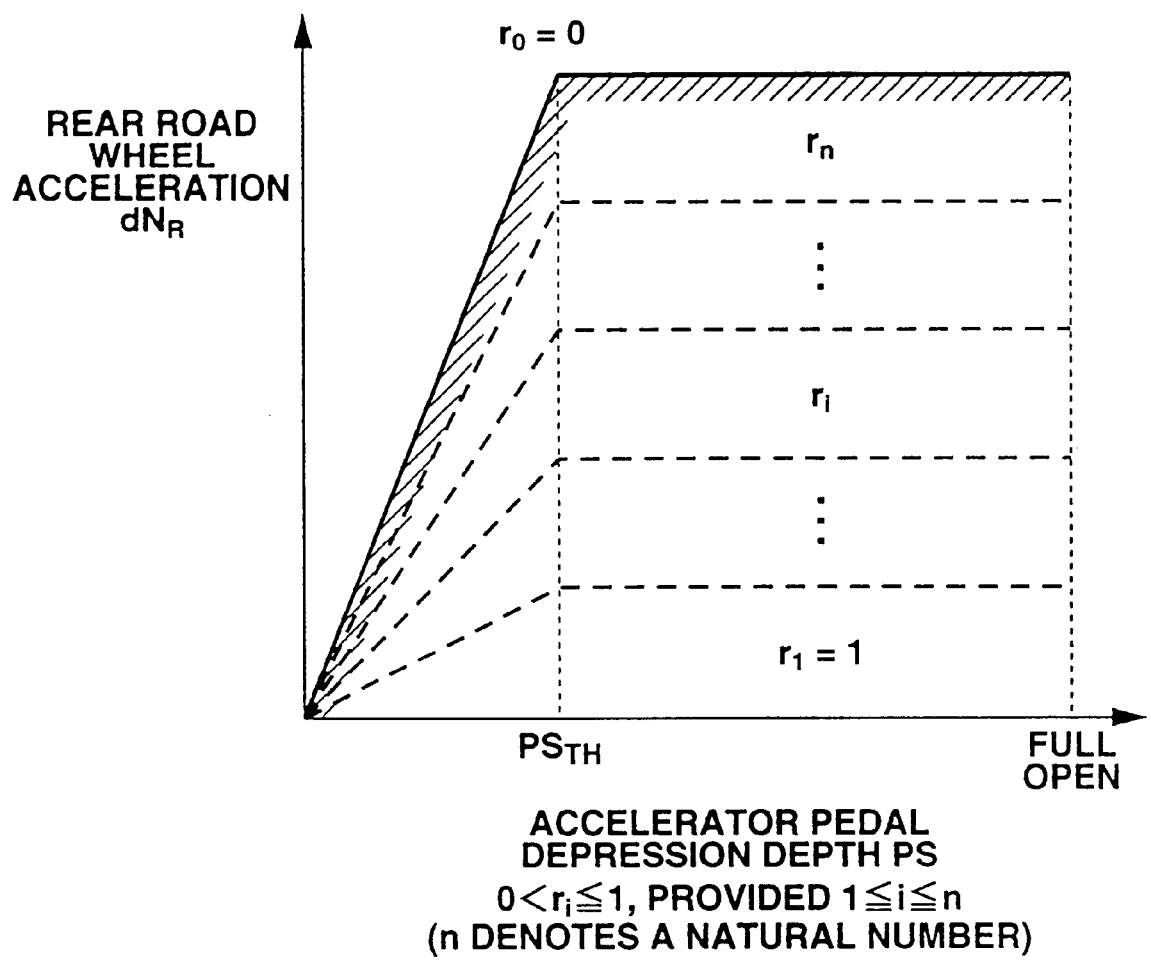
FIG. 5 is a control map to set a correction coefficient r.

On the other hand, correction coefficient calculating section 28 calculates a correction coefficient r in accordance with, for example, a search result of a control map shown in FIG. 5 on the basis of rear road wheel acceleration $dN_R$ calculated by rear road wheel acceleration calculating section 24 and accelerator pedal depression depth PS from accelerator pedal depression sensor 12. It is noted that correction coefficient r is set to fall in a range such as $0 < r \leq 1$.

Control map shown in FIG. 5 is previously stored into a still another predetermined memory area in a three-dimensional array form.

Correction coefficient r approaches to zero as rear road wheel acceleration $dN_R$ is increased and as the accelerator pedal depression depth PS is shallower than a threshold value $PS_{TH}$.

Then, correction coefficient r is divided in a stepwise manner into 1 through n (n: natural number) and is set to be varied between $0 < r \leq 1$ in accordance with the accelerator pedal depression depth PS and rear road wheel acceleration $dN_R$.

In other words, if correction coefficient r is set in ten steps, each set value of correction coefficient r is expressed as $r_1=1$, $r_2=0.9$, $r_3=0.8$, - - - , $r_9=0.2$, and $r_{10}=0.1$.

Therefore, in a case where correction coefficient r indicates correction coefficient set value $r_0$ ($r=r_0$) in FIG. 5, correction coefficient r is forcefully set to r, (if n=10, $r=r_{10}$).

Then, a motor drive torque calculating section 29 calculates a motor drive torque T* to be developed by the motor 9 on the basis of control torque T selectively set by control torque setting section 27 and correction coefficient r calculated by correction coefficient calculating section 28.

A motor controlling section 30 calculates a target excitation voltage for motor 9 which can develop motor drive torque T* and performs a control over a coil excitation voltage for motor 9. Motor controlling section 30 outputs an engage command signal to electromagnetic clutch 9A for output axle of motor 9 to be connected to final speed-reduction gear unit 8 as shown in FIG. 2.

It is noted that controller 10 corresponds to drive controlling means, first road wheel velocity calculating section 21, rear road wheel velocity calculating section 22, and front-and-rear road wheel velocity difference calculating section 23 corresponds to road wheel velocity difference detector, accelerator pedal depression sensor 12 corresponds to accelerator pedal depression depth detecting means (or, driver's vehicular acceleration intention detecting means in a broad sense of term), target torque TFB calculating section 25 corresponds to first target torque calculating means, target torque TFF calculating section 26 corresponds to second target torque calculating means, control torque setting section 27 corresponds to target torque calculating means, rear road wheel acceleration calculating section 24 corresponds to another motor driven wheel acceleration detecting means, and correction coefficient calculating section 28 and motor drive torque calculating section 29 correspond to correction means.

Figure 6:
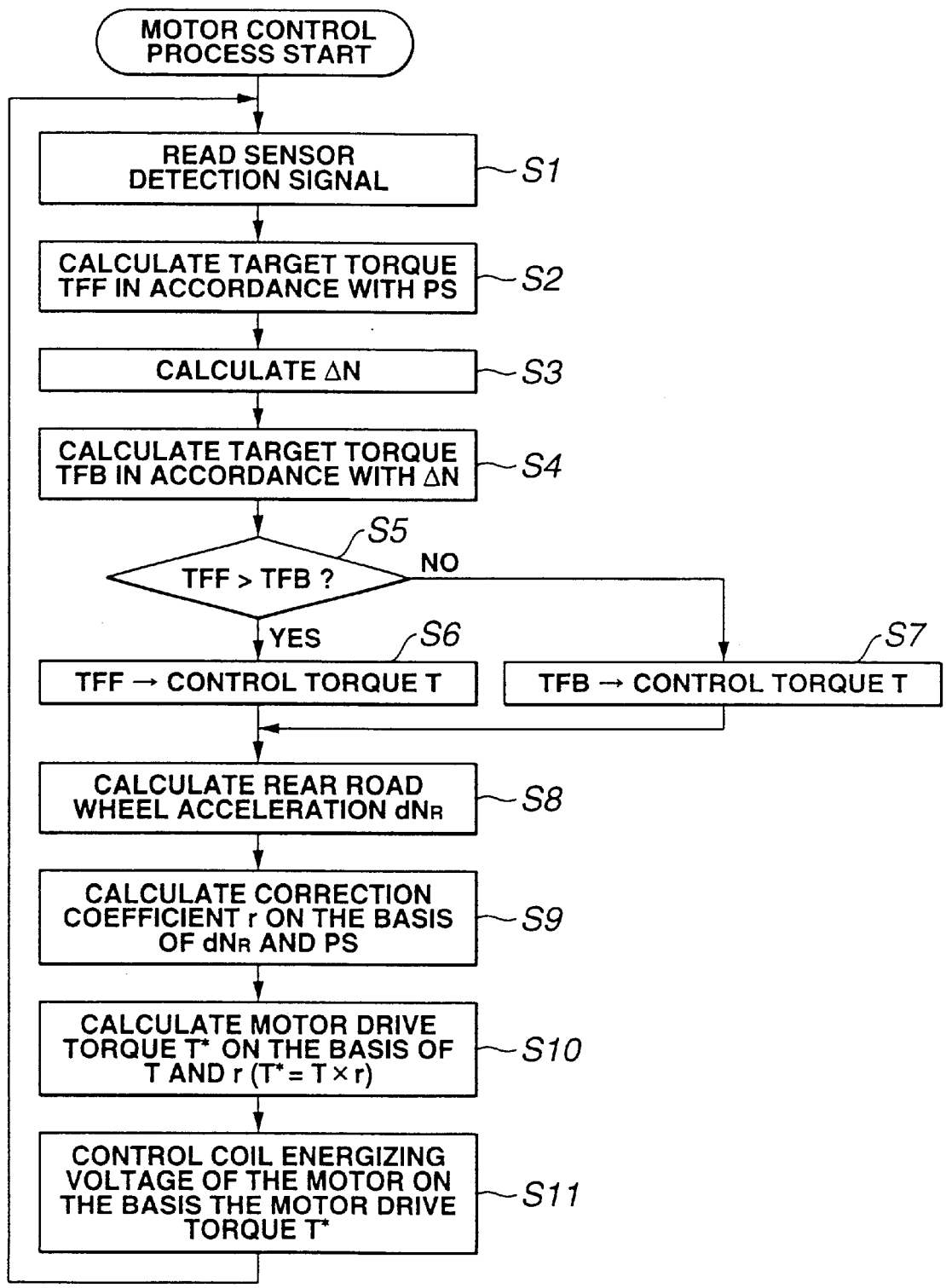
FIG. 6 is an operational flowchart representing one example of a processing routine of a drive control procedure routine of an electric motor in the controller shown in FIGS. 1A and 1B.

FIG. 6 shows an operational flowchart for explaining an operation of the preferred embodiment of the front wheel-and rear-wheel drive vehicle described above.

The flowchart shown in FIG. 6 representing a processing procedure in the drive control of motor 9 by controller 10.

At step S1, controller 10 reads accelerator pedal depression depth PS and detection signal of respective road wheel velocity sensors 11FL, 11FR, 11RL, and 11RR.

At step S2, controller 10 determines target torque TFF by the search from control map shown in FIG. 4 using accelerator pedal depression depth PS is transmitted to rear road wheels 1RL and 1RR.

Hence, motor drive torque T* is developed in accordance with accelerator pedal depression depth PS in a feed-forward manner, viz., with a high response characteristic.

At the same time at which accelerator pedal 12A is depressed, rear left and right road wheels 1RL and 1RR push forward the vehicle to assist the vehicular propelling force.

At this time, target torque TFF is set such that as accelerator pedal depression depth PS is smaller (shallower) than threshold value $PS_0$, accelerator pedal depression depth PS is set to be a larger value.

Hence, if accelerator pedal depression depth PS exceeds threshold value $PS_0$, target torque TFF is fixedly set to a predetermined value.

At a step S3, controller 10 calculates front road wheel velocity and rear road wheel velocity on the basis of detection signals of respective road wheel velocity sensors 11FL, 11FR, 11RL, and 11RR and calculates road wheel velocity difference ΔN of front and rear road wheels (front-and-rear road wheel velocity difference) from these velocity values. If TFF>TFB at step S5 (Yes), the routine goes to a step S6 in which target torque TFF is set as control torque T (TFF→T). If TFF≦TFB at step S5 (No), the routine goes to a step S7 in which target torque TFB is set as control torque T (TFB→T). That is to say, control torque T is selected from one of either target torque TFB or TFF which is larger than the other.

Next, controller 10 calculates rear road wheel acceleration $dN_R$ by, for example, deriving a deviation per unit time from a deviation between a previous rear road wheel revolution velocity and the present rear road wheel revolution velocity at a step S8 on the basis of the read road wheel velocities from the road wheel velocity sensors 11RL and 11RR.

At the next step S9, controller 10 calculates correction coefficient r by the search from control map shown in FIG. 5. At this time, as rear road wheel acceleration $dN_R$ is increased, correction coefficient r is set to a relatively small value. In addition, correction coefficient r is set to the small value as depression depth PS of accelerator pedal 12A is shallow.

At the next step S10, controller 10 calculates motor drive torque T* by multiplying correction coefficient r with control torque T set at step S7 (T*=T×r).

At the next step S11, controller 10 drives motor 9 to output calculated motor drive torque T*.

Therefore, since motor drive torque T* is developed by motor 9 and is transmitted to rear left and right road wheels 1RL and 1RR via final reduction gear unit 8 and rear road wheel side drive axle 7.

Hence, if the front wheel-and rear-wheel drive vehicle is to be started, for example, on a flat road surface, the front wheel-and rear-wheel drive vehicle is started after accelerator pedal 12A has been depressed so that the front-and-rear road wheel velocity difference ΔN occurs.

Since, during such a vehicular start as described above, target torque TFF calculated in accordance with accelerator pedal depression depth PS is larger than target torque TFB calculated on the basis of the front-and-rear road wheel velocity difference ΔN, target torque TFB is set as control torque T. At this time, since rear road wheel acceleration $dN_R$ is relatively small, correction coefficient r is set to a value relatively near to one.

Hence, motor drive torque T* provides a value almost in accordance with target torque TFB. The driving force in accordance with accelerator pedal depression depth PS is transmitted to rear left and right road wheels 1RL and 1RR. Thus, motor drive torque T* is developed with the feed-forward control characteristic, viz., with the high response characteristic in accordance with the depression depth PS of accelerator pedal 12A. At the same time as accelerator pedal 12A is depressed, the rear road wheels push the vehicle in a forward direction and smooth and powerful vehicular start can be achieved.

If the front-and-rear road wheel velocity difference ΔN occurs with the vehicle started from the above-described state, target torque TFB calculated at step S4 is increased in accordance with the increase in the front-and-rear road wheel velocity difference ΔN. If target torque TFB exceeds target torque TFF based on depression depth PS of accelerator pedal 12A, target torque TFF is set as control torque T so that motor 9 is driven in accordance with front-and-rear road wheel velocity difference ΔN.

Thereafter, the drive control for motor 9 is carried out so that such a motor torque that front-and-rear road wheel velocity difference ΔN can be reduced is developed and outputted in accordance with depression depth PS and front-and-rear road wheel difference ΔN and a larger motor torque is generated as depression depth PS of accelerator pedal 12A is increased.

Motor 9 can, thus, be driven in accordance with the driver's vehicular acceleration intention on the basis of the road surface situation and accelerator pedal depression depth PS. Consequently, a vehicular drive assistance by means of motor driven rear road wheels 1RL and 1RR can be performed.

On the other hand, in a case where the vehicle is to be started on a road surface such that frictional coefficient μ at the rear road wheel position is lower than that at the front road wheel position, rear left and right road wheels 1RL and 1RR often slip when motor 9 is operated to drive rear left and right road wheels 1RL and 1RR during the vehicular start.

However, if the slips on rear road wheels 1RL and 1RR occur when motor 9 drives the rear road wheels 1RL and 1RR during the vehicular start, rear road wheel accelerations $dN_R$ is increased, correction coefficient r is set to relatively smaller value, viz., near to zero from the control map shown in FIG. 5.

Consequently, control torque T is corrected in a decrease direction by means of correction coefficient r to provide the motor drive torque T*. Hence, such a motor output torque that is smaller than control torque T is transmitted to rear left and right road wheels 1RL and 1RR. Hence, the undesired rear road wheel slips can be avoided and the drive assistance through the rear road wheels 1RL and 1RR can be performed.

In addition, for example, in a case where the front wheel-and rear-wheel drive vehicle is started after a sufficient safety confirmed drive state such as a green signal wait state at a traffic intersection, accelerator pedal depression depth PS becomes relatively large.

Due to the select-high operation in controller 10, target torque TFF in accordance with accelerator pedal depression depth PS is set as control torque T. Since rear wheel acceleration $dN_R$ is small and correction coefficient r is set to be a relatively large value, motor drive torque in accordance with accelerator pedal depression depth PS is developed and the rear road wheel assist can sufficiently be carried out. Hence, smooth and powerful start of the vehicle can be achieved.

On the contrary, if the front wheel-and rear-wheel drive vehicle is started at an extremely low vehicular velocity in such a case where the front wheel-and rear-wheel drive vehicle is joined with a stream of vehicles onto a preference road from a parking lot or narrow street, in other words, in a case where the motor drive torque is not so necessary, depression depth PS of accelerator pedal 12A indicates a relatively small value. At this time, since, in a region in which accelerator pedal depression depth PS is small, correction coefficient r is set to be a relatively small value even if the rear road wheel acceleration $dN_R$ is increased. In other words, control torque T is corrected to be smaller. Hence, the start assist by means of rear road wheels 1RL and 1RR can be suppressed and the rear road wheel drive assistance can be avoided more than necessary.

In a case where the vehicle is started on an ascending slope even if accelerator pedal depression depth PS is the same as each of the cases described above, a sufficient motor torque is needed.

In this case, since correction coefficient r is set to be a larger value as rear road wheel acceleration $dN_R$ becomes smaller, as shown in FIG. 5, a sufficient motor torque can be developed. Consequently, a sufficient rear road wheel drive assistance can be obtained. In other words, correction coefficient r is set in accordance with rear road wheel acceleration $dN_R$ so that the front wheel-and rear-wheel drive vehicle can have an ascending slope sensitivity. A powerful drive assistance in accordance with the road surface situation can automatically be carried out.

As described above, control torque T is set on the basis of front-and-rear road wheel velocity difference ΔN and accelerator pedal depression depth PS and control torque T is corrected on the basis of rear road wheel acceleration $dN_R$ and depression depth PS of accelerator pedal 12A, a more fine control of the drive of motor 9 can be performed in accordance with road surface situation, driver's intention, and slip occurrence situation. During the vehicular start, a sufficient whole road wheel drive by means of the rear road wheel drive assistance can be achieved. During the vehicular run, a vehicular motion stability can be improved.

In the preferred embodiment, front wheel-and rear-wheel drive vehicle in which motor 9 having only a power running function has been described.

Such an electric motor as that having both power running function and regeneration function may be used in which the motor generates electric power as a generator by means of its regeneration function, the electrical energy being stored into battery unit 13 or another battery unit.

In the preferred embodiment, target torque TFB, TFF and correction coefficient r are set using respective control maps shown in FIGS. 3, 4, and 5. However, these variables may previously be stored as corresponding data on variables in respective function equations.

It is noted that a motor defined in claims comprises engine 5 or may comprise a hydraulic motor, or electric motor and another motor independently installed from the motor described above and defined in the claims comprises electric motor 9 or may comprise the hydraulic motor.

It is also noted that a driver's vehicular acceleration intention detector to detect a manipulated variable representing the driver's vehicular acceleration intention comprises the accelerator pedal depression sensor 12 of the accelerator pedal 12A.

The entire contents of Japanese Patent Applications No. Heisei 11-321037 filed in Japan on Nov. 11, 1999 are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A front-wheel and rear-wheel drive vehicle comprising:
   a motor to develop a mechanical energy and to drive either one of front road wheels or rear road wheels of the vehicle;
   another motor to develop the mechanical energy and to drive the other of the front road wheels or the rear road wheels;
   a drive controller to control a driving force of the other motor;
   a front and rear road wheel velocity difference detector to detect a front and rear road wheel velocity difference between the front and rear road wheels;
   a driver's vehicular acceleration intention detector to detect a manipulated variable representing a driver's acceleration intention;
   a target torque calculating section that calculates a target torque outputted from the other motor in accordance with the detected front and rear road wheel velocity difference and the manipulated variable representing the driver's acceleration intention;
   another motor driven wheel acceleration detector to detect an acceleration of the road wheel driven by the other motor; and a target torque corrector to correct the target torque on the basis of the acceleration of the other motor driven road wheel detected by the other motor driven wheel acceleration detector and the manipulated variable representing the driver's vehicular acceleration intention detected by the driver's vehicular acceleration intention detector.

2. A front-wheel and-rear-wheel drive vehicle as claimed in claim 1, wherein the target torque corrector corrects the target torque in a decrease direction thereof on the basis of the acceleration of the other motor driven road wheel detected by the other motor driven road wheel acceleration detector and the manipulated variable representing the driver's vehicular acceleration intention detected by the driver's acceleration intention detector.

3. A front-wheel and rear-wheel drive vehicle as claimed in claim 2, wherein the target torque calculating section comprises: a first target torque calculator to calculate a first target torque which increases as the front-and-rear road wheel velocity difference becomes increased on the basis of the detected front-and-rear road wheel velocity difference; and a second target torque calculator to calculate a second target torque which increases as a magnitude of the manipulated variable representing the driver's vehicular acceleration intention is increased on the basis of the manipulated variable representing the driver's vehicular acceleration intention detected by the driver'vehicular acceleration intention detector and wherein the target torque calculating section selectively sets either one of the first target torque or the second target torque which is larger than the other as the target torque.

4. A front-wheel and rear-wheel drive vehicle as claimed in claim 2, wherein the target torque corrector corrects the target torque by a correction width which is wider as the acceleration of the other motor driven wheel becomes larger.

5. A front-wheel and rear-wheel drive vehicle as claimed in claim 2, wherein the target torque corrector corrects the target torque by a correction width which is wider as a magnitude of the manipulated variable representing the driver's vehicular acceleration intention becomes smaller.

6. A front-wheel and rear-wheel drive vehicle as claimed in claim 5, wherein the correction width comprises a correction coefficient r for the set target torque and wherein the correction coefficient r is varied as $0 < r \leq 1$ and which becomes nearer to zero as the acceleration of the other motor driven wheel becomes larger and as the magnitude of the manipulated variable representing the driver's vehicular acceleration intention becomes smaller than a threshold value, the correction coefficient r becoming nearer to zero only in proportion to the acceleration of the other motor drive road wheel when the magnitude of the manipulated variable representing the driver's vehicular acceleration intention becomes increased and exceeds the threshold value.

7. A front-wheel and rear-wheel drive vehicle as claimed in claim 1, wherein the drive controller controls the driving force of the other motor on the basis of the target torque which is corrected by the target torque corrector.

8. A front-wheel and rear-wheel drive vehicle as claimed in claim 1, wherein the motor comprises an internal combustion engine to drive the front road wheels and the other motor comprises an electric motor to drive the rear road wheels.

9. A front-wheel and rear-wheel drive vehicle as claimed in claim 1, wherein the driver's vehicular acceleration intention detector comprises an accelerator pedal depression sensor to detect a depression depth of an accelerator pedal from its released position.

10. A front-wheel and rear-wheel drive vehicle comprising:

motor means for developing a mechanical energy and driving either one of front road wheels or rear road wheels of the vehicle;

another motor means for developing the mechanical energy and for driving the other of the front road wheels or the rear road wheels;

drive controlling means for controlling a driving force of the other motor means;

front and rear road wheel velocity difference detecting means for detecting a front and rear road wheel velocity difference between the front and rear road wheels;

driver's vehicular acceleration intention detecting means for detecting a manipulated variable representing a driver's vehicular acceleration intention;

target torque calculating means for calculating a target torque outputted from the other motor means in accordance with the detected front-and-rear road wheel velocity difference and the manipulated variable representing, the driver's acceleration intention;

another motor driven wheel acceleration detecting means for detecting an acceleration of the road wheel driven by the other motor means; and correcting means for correcting the target torque on the basis of the acceleration of the other motor means driven road wheel detected by the other motor driven road wheel acceleration detecting means and the manipulated variable representing the driver's vehicular acceleration intention detected by the driver's vehicular acceleration intention detecting means.

* * * * *